(12) United States Patent
Baker (10) Patent No.: US 7,121,804 B1
(45) Date of Patent: Oct. 17, 2006

(54) FAN SYSTEM

(76) Inventor: Glenn James Baker, 812 Cherry St., Rawlins, WY (US) 82301

( * ) Notice: Subject to any disclaimer, the term of this patent is extended or adjusted under 35 U.S.C. 154(b) by 148 days.

(21) Appl. No.: 10/900,777

(22) Filed: Jul. 27, 2004

(51) Int. Cl.
*F03D 1/02* (2006.01)

(52) U.S. Cl. ............... 416/201 A; 416/63; 415/202

(58) Field of Classification Search ............... 416/63, 416/201 R, 201 A, 202, 199.4, 4.3, 4.5, 908, 416/208.1, 176; 239/14.2, 77, 78, 498, 461
See application file for complete search history.

(56) References Cited

U.S. PATENT DOCUMENTS

| | | | |
|---|---|---|---|
| 460,781 A | 10/1891 | Keller | |
| 508,009 A | 11/1893 | George et al. | |
| 572,178 A | 12/1896 | Patterson et al. | |
| 1,142,502 A | * 6/1915 | Donnelly | 416/9 |
| 1,581,911 A | 4/1926 | Bogaty | |
| 2,023,659 A | 12/1935 | Amico | |
| 2,322,110 A | * 6/1943 | Bock | 261/24 |
| 2,549,819 A | 4/1951 | Kane | |
| 2,830,435 A | 4/1958 | Mallory | |
| 2,839,888 A | 6/1958 | Mallory | |
| 3,135,466 A | * 6/1964 | Reid | 239/14.1 |
| 3,251,183 A | 5/1966 | Whitlow | |
| 3,429,507 A | * 2/1969 | Jones | 239/14.1 |
| 3,905,195 A | 9/1975 | Gregory | |
| 3,990,238 A | 11/1976 | Bailey | |
| 4,065,225 A | 12/1977 | Allison | |
| 4,077,214 A | 3/1978 | Burke, Jr. et al. | |
| 4,220,005 A | 9/1980 | Cutts | |
| 4,416,113 A | 11/1983 | Portillo | |
| 4,427,343 A | 1/1984 | Fosdick | |
| 5,669,758 A | 9/1997 | Williamson | |
| 6,068,446 A | 5/2000 | Tangler et al. | |
| 6,467,233 B1 | 10/2002 | Maliszewski et al. | |

FOREIGN PATENT DOCUMENTS

FR 2 286 952 10/1974

OTHER PUBLICATIONS

D.A. Shafer, K.R. Strawmyer, R.M. Conley, J.H. Guidinger, D.C. Wilkie, and T.F. Zellman With Assistance From D.W. Bernadett, WindPACT Turbine Desing Scaling Studies: Technical Area 4—Balance-of-Station Cost, National Renewable Energy Laboratory, a U.S. Dept. of Energy Laboratory, Jul. 2001, pp. (1)-(B-1) NREL/SR-500-29950, Golden Colorado, U.S.
Global Energy Concepts, LLC, WindPACT Turbine Design Scaling Studies Technical Area 3-Self-Erecting Tower and Nacelle Feasibility, National Renewable Energy Laboratory, a U.S. Dept of Energy Laboratory, May 2001, NREL/SR-500-29493 Golden, Colorado, U.S.

* cited by examiner

*Primary Examiner*—Ninh H. Nguyen
(74) *Attorney, Agent, or Firm*—Ramon L. Pizarro; Edwin H. Crabtree (57) ABSTRACT

A wind power generating system that includes a series of progressively larger fan fans, the fans positioned in series relative to one another such that the blades of the trailing fans project into the wind stream that has been disturbed by the preceding fan and the undisturbed wind stream.

16 Claims, 6 Drawing Sheets

FAN SYSTEM

BACKGROUND OF THE INVENTION (a) Field of the Invention

This invention generally relates to a fan system for harnessing wind power. More particularly, but not by way of limitation, to a system that uses several fans of progressively larger fan diameter that are positioned in series.

(b) Discussion of Known Art

Wind power has long been recognized as a source of reliable, environmentally safe source of power. Accordingly, many devices for harnessing wind power have been developed. One example of these devices is shown in U.S. Pat. No. 1,142,502 to Donnelly. Donnelly teaches the use of a pair of different sized fans connected in series to one another. The type of fan and arrangement taught by Donnelly was popular in its day, but this design gave way to the use of long blades with airfoil sections. These blades are mounted to a gearbox that is used for transmitting rotational power harnessed through the blades to a generator.

Typically, wind turbines are supported at a considerable height above ground level. The reason for the elevated support is two-fold. First, the blades of the fan are typically very long, in the order of at least fifteen feet per blade. The length of the blade is dictated by the large amount of torque needed to turn the generator connected to the blade. Second, in order to obtain the full use of the blades, the fan must be position at a sufficiently high position above ground to position the blades in the wind stream that is relatively unaffected by the ground.

The placement of the blades at a high location above ground requires the use of a tall tower, which must be capable of resisting very large bending moments created by the wind forces on the fan at the top of the tower. These bending moments have made the creation of lightweight towers a problem that is seemingly impossible to solve. Thus wind power generation stations have been confined to being large permanent installations that include towers made from reinforced concrete or heavy gage steel construction.

The weight associated with the towers has made portable wind power generation stations unfeasible. Portable wind power generation stations are highly desirable due to the fact that the direction of prevailing wind in an area is not constant. Thus, a wind power generation system, or fan farm, may provide optimal performance during certain months of the year, and provide inefficient results during other times of the year. This variation in efficiency is due to the fact that, while the blades and generator assembly may rotate in order to align the assembly with the wind, the fixed position of the various fan installations causes some installations to remain in a wind shadow behind other fan installations.

Thus, in order to provide efficiency to the installations on a fan farm, it would be advantageous to be able to provide a wind power generation system or fan system that is portable, so that the alignment and arrangement of the individual fan stations may be rearranged in the field to allow the placement of these stations to be optimized.

Still further, there remains a need for a wind power generation system that reduces the bending moment created on the support structure, while still harnessing the torque required to rotate the generator. Thus, there remains a need for a wind power generation system that allows the support of the fan blades with a light-weight, efficient structure.

There remains a need for a wind power generation system that can use small amounts of wind to rotate large fans.

SUMMARY

It has been discovered that the problems left unanswered by known art can be solved by providing a wind power generating system that includes:

a series of progressively larger fan fans, the fans positioned in series relative to one another such that the blades, of the trailing fans project into the wind stream that has been disturbed by the preceding fan and the undisturbed wind stream.

According to one example of the disclosed invention each succeeding fan is of a larger diameter than the previous fan. This enlargement of the succeeding fan reduces the detrimental effects of wind dispersion of wind moving past the first fan on the succeeding fan. In other words, as wind is dispersed or fanned out as it moves past a fan. Therefore, in order to ensure that the succeeding fan captures all of the wind that passed through the first fan, the succeeding fan will be of a larger diameter than the first fan.

According to a highly preferred example of the invention, the succeeding fan will include short blades that project into the stream of undisturbed and disturbed wind that has passed the preceding fan. Thus, it is contemplated that the succeeding fans or fans will not include blades in the region that is in the wind shadow of the preceding fan.

Still further, it is contemplated that the first fan will be preceded by a dispersion cone that faces into the wind, and causes the wind to be dispersed or redirected to flow in a generally conical path. The base of the cone will be in front of the first fan. Thus, the wind that strikes the blades of the first fan has been directed to flow towards the outer perimeter of the first fan by the shape of the cone. The air will then flow to the succeeding fan, which will have blades that supported at a position that allows the blades of the succeeding fan to lie directly in the wind path.

It is also contemplated that the dispersion cone will be made of a permeable, porous structure. Furthermore, mounted inside the dispersion cone will be a nozzle that delivers waste water or steam to the porous structure of the dispersion cone, causing this waste water to evaporate. The evaporative effect will cause cooling, and in turn result in a reduction in pressure around the dispersion cone. The reduction in pressure will in turn induce a flow of air towards the cone, and the flow of air will then advance towards the fans.

Cooling of the air flow will occur with evaporation of the waste water in air with low humidity. It is particularly advantageous to have high evaporation in to low ambient humidity air stream. This is because water vapor is inherently lighter than air. The decreased weight of the combined fluids will cause increased air flow to equalize air pressure displaced by the humidity, or water vapor, and will result in an increase in ambient air flow until equalization of air pressure has been established. By providing high evaporation areas within the cone and ⅔ areas of each fan or turbine will draw air from the surroundings, causing an air flow past the fans. The evaporation or reduced pressure areas may be created by delivering waste heat or steam from power plants, or other sources through the nozzles placed between the fans.

Because each of the fans will encounter airflow on the outer perimeters of the fan assembly, the total horizontal force on the fan will be low as compared to the horizontal force experienced by fans that are completely exposed to the wind flow. Accordingly, the disclosed invention will result in lower structural requirements for support, than are known systems. It is contemplated that the fans of the disclosed invention will be supported by a light, truss type support structure. Furthermore, it is contemplated that the trusses used with disclosed invention will allow the support structure of the succeeding fans to nest within one another, and thus allow each succeeding fan to be positioned in a close, generally parallel manner to the preceding fan.

A significant advantage of the disclosed support structure used with the invention is that due to the lightweight of the overall A significant advantage of the disclosed support structure used with the invention is that due to the lightweight of the overall structure, the structure may be conveniently mounted on wheels or other transportation equipment. It is further contemplated that the disclosed frame structure will include compartments that may be filled with a ballast material, such as water. Thus, it will be appreciated that the disclosed frame structure will allow removal of the ballast material in order to allow easy transportation of the support frame or structure, further facilitating the optimal arrangement of the disclosed invention at a wind farm, for example.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
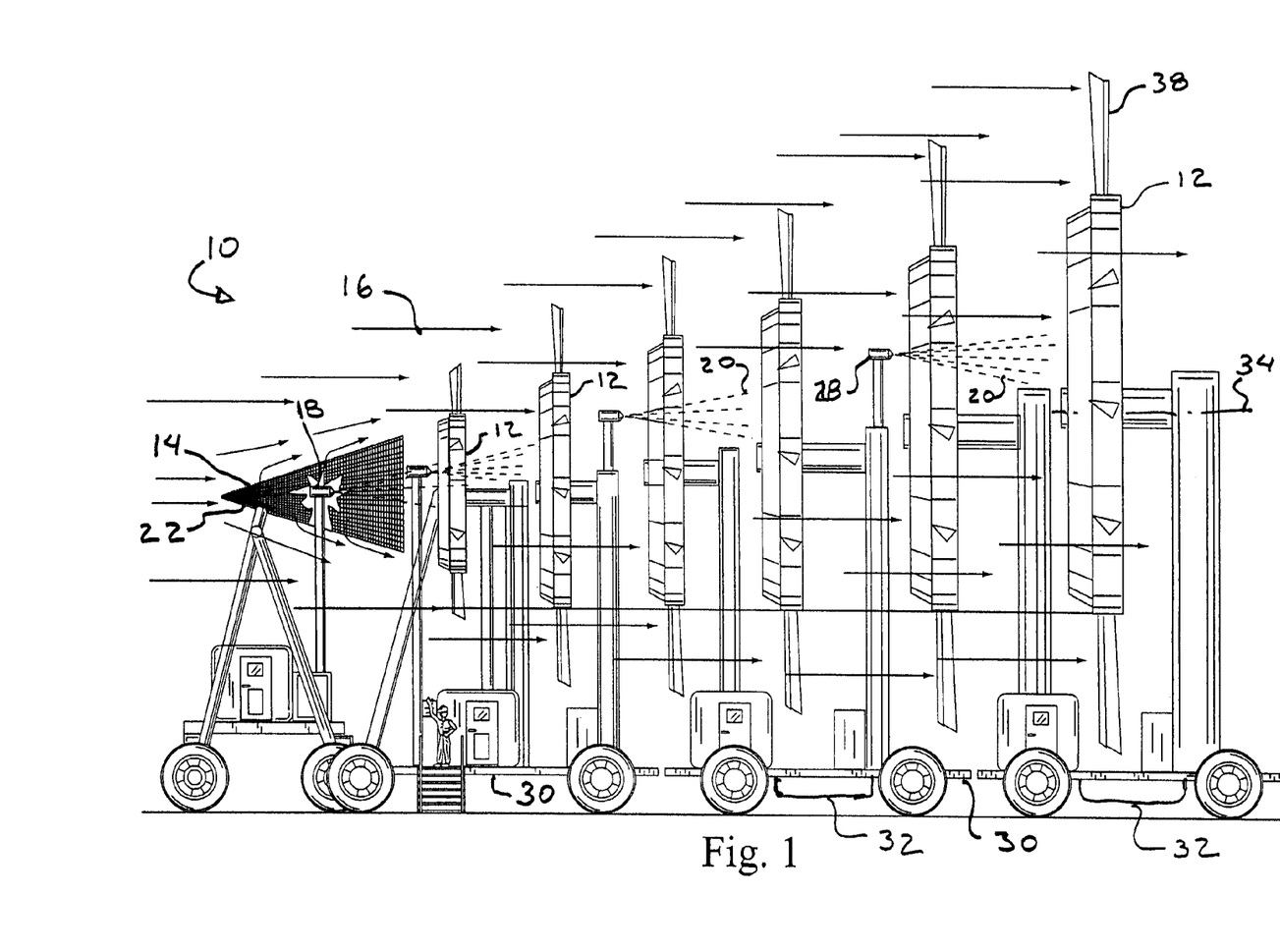
FIG. 1 is a side view of an embodiment of the invention. The view illustrating the use of the dispersion cone, a leading fan and a succeeding fan.
Figure 2:
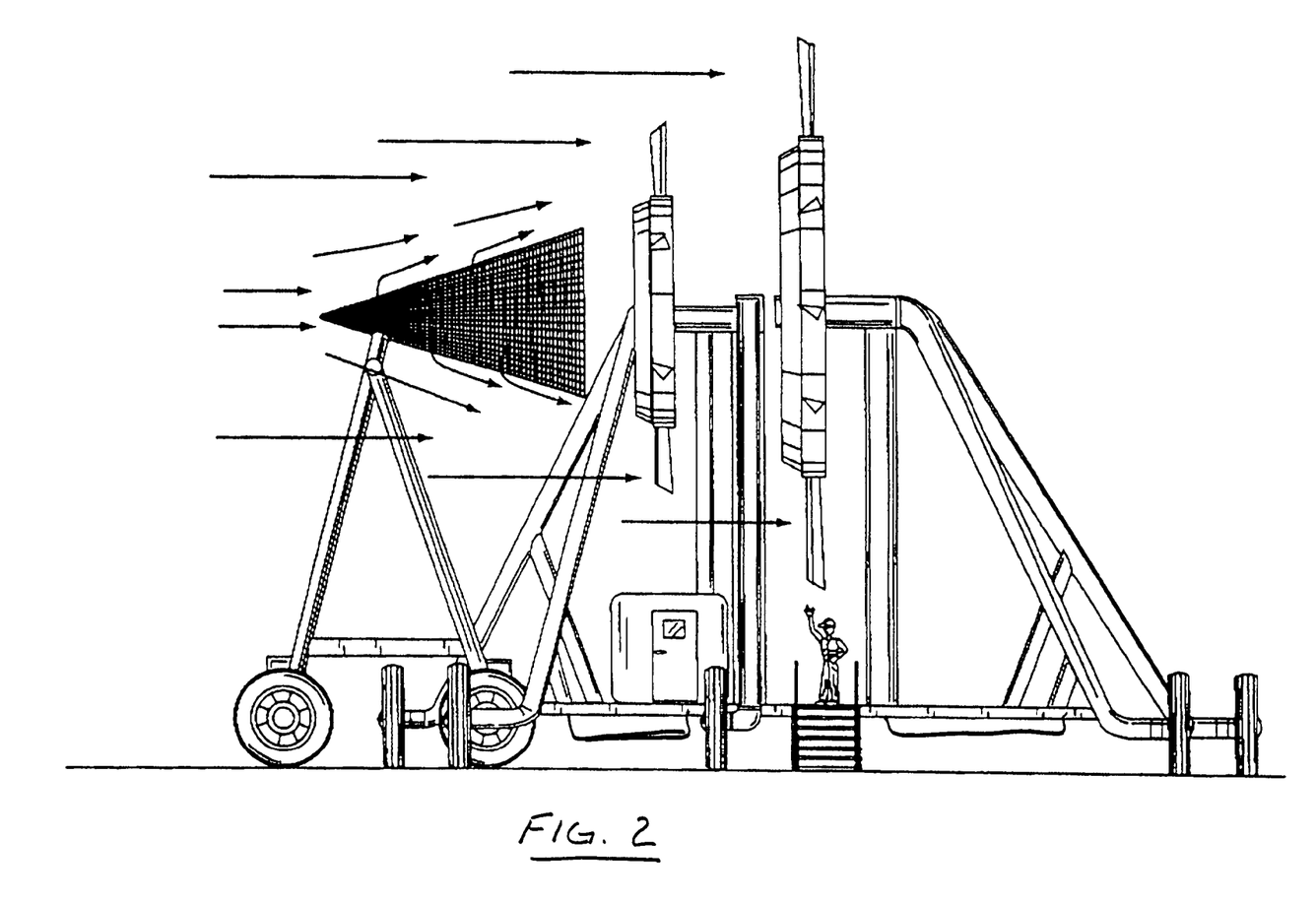
FIG. 2 illustrates the use of the disclosed invention with several succeeding fans and the use of an evaporation nozzle for use within the dispersion cone as well as between the fans.
Figure 3:
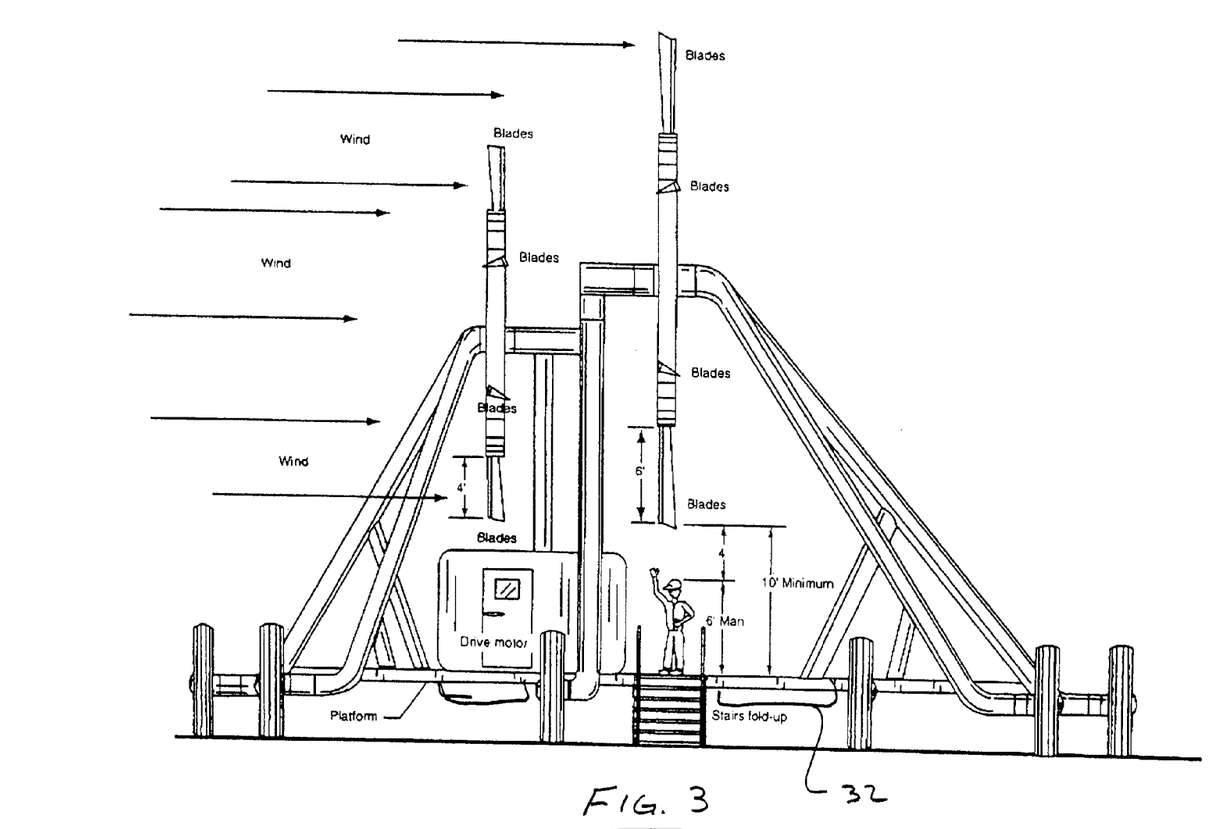
FIG. 3 illustrates a set of fans and the nesting frames.
Figure 4:
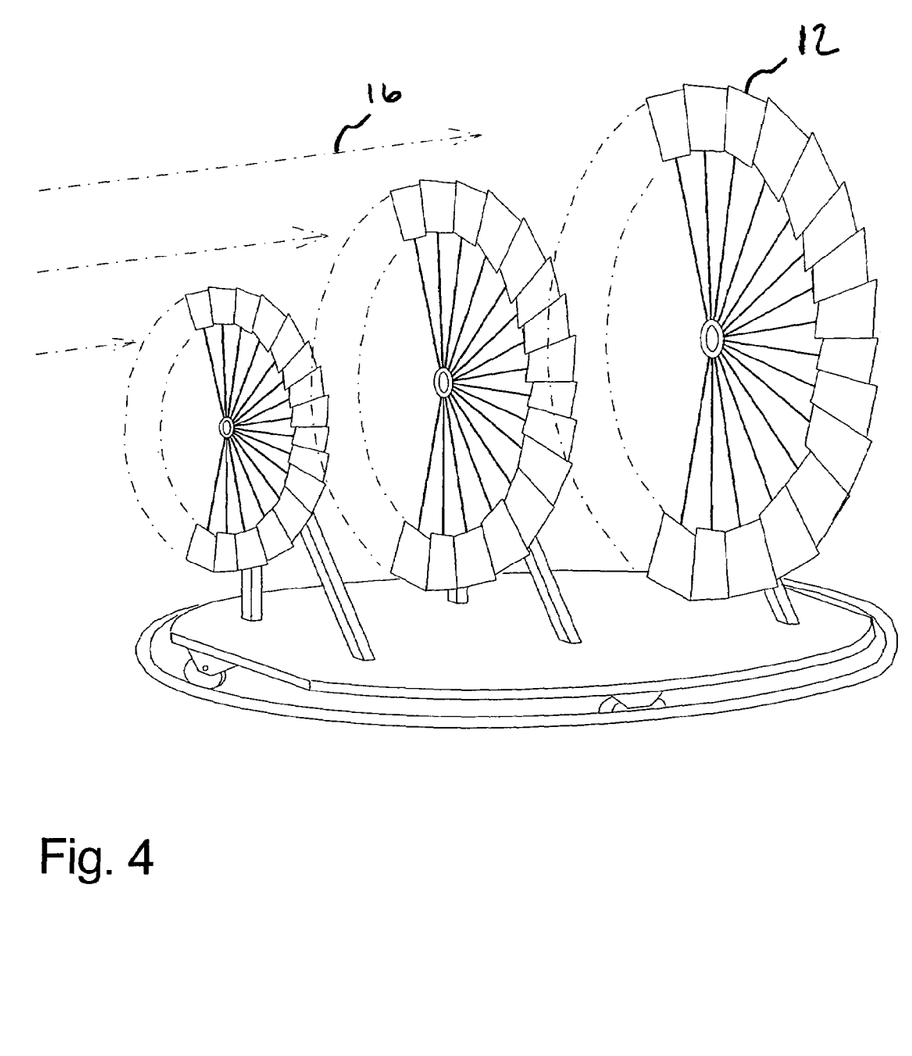
FIG. 4 illustrates another example of placement of the successive fans.

Turning now to FIG. 1 where an example of the disclosed system 10 has been illustrated in use. The illustrated example of the system shows the use of several windmill fans 12 that are mounted on portable bases 30. In front of the fans 12 is an evaporation cone 14 that serves to redirect the flow of wind approaching the fans 12 and to aid in the acceleration of the wind 16 that is approaching the fans 12. Additionally, FIG. 1 illustrates that it is contemplated that the cone 14 will house a nozzle 18 that will deliver a fluid 20, such as water, that will be used to enhance or encourage the flow of wind towards the fans 12.

Figure 7:
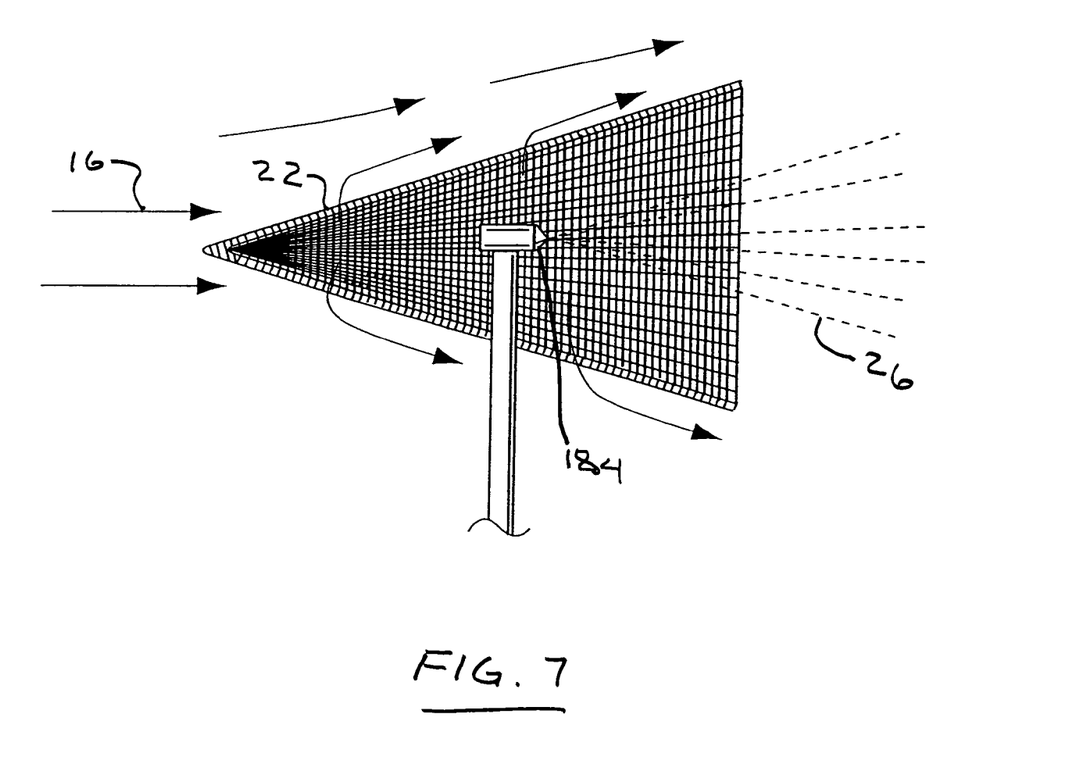
FIG. 7 is a cross sectional view of the dispersion cone.

As shown on FIG. 7, it is contemplated that the evaporation cone 14 will have a generally conical outer surface 22. It is important to note that the term "generally conical" as used herein shall include shapes that do not fall into a strict geometrical or mathematical definition of a cone, but also include shapes that are of a small cross-section at one end and are of a larger cross-section at another end. Examples of such shapes include generally parabolic surfaces, or pyramidal or similar multi-faceted shapes.

As shown on FIGS. 1 and 7, it is contemplated that more than one fluid delivery nozzle 18 will be used with the system 10. The illustrated example of the cone 14 shows that it is contemplated that the conical outer surface 22 will be made of a porous material that will allow evaporation of the fluid 20. In the illustrated example this porous material is a mesh-type material. However, it is contemplated that other materials that promote the mixing of water and flowing air, and thus promote evaporation may also be used.

FIGS. 1 and 7 also illustrate that the nozzle 18 is positioned within the cone 14. As indicated above, it is contemplated that several nozzles may be placed at or just next to the conical outer surface 26 of the cone 14, so that a fluid delivered from the nozzle will evaporate next to the generally conical outer surface. It is further contemplated that various types of fluids may be delivered through the nozzle 18. It is preferred, however, that the fluid will be water. The use of water will reduce the possibility of delivering harmful agents into the air, and provide the evaporation need to enhance the flow of air over the cone 14.

The fluid delivery nozzle 18 will enhance airflow by delivering a spray of water 26, preferably in a liquid state, to the area behind (next to the wide portion of) the cone. This water will then evaporate, cooling the area behind the cone and thus causing a reduction in pressure behind the cone. This reduction in pressure will be due to a contraction of the air affected by the spray from the nozzle, cause air to flow towards the area of reduce pressure. Because of the enhancement of the flow in a direction that will enhance rotation of the fans 12, it is contemplated that a fan fluid delivery nozzle 28 will be positioned next to each fan 12.

Also illustrated in FIG. 1 is that each of the fans 12 will be mounted on a portable base 30. Additionally, it is contemplated that each of the portable bases 30 will also include a ballast fluid reservoir 32 that will be mounted from the portable base 30. The ballast fluid reservoir 32 may be filled with water that may be delivered through the nozzle 18, and will serve as a counterweight to resist the bending forces imposed on each of the fans by the oncoming wind that is rotating the blades. Thus, the position of the portable bases 30, and hence the entire system 10, may be easily changed or modified by simply removing the ballast water from one of the bases 30, then moving the base to the new desired location, and then refilling the ballast fluid reservoir with the ballast fluid that had been previously removed.

As illustrated in FIGS. 1, 2, 3 and 4, it will be understood that each of the fans will rotate about an axis of rotation 34. In order to optimize the capture of the wind, the axis of rotation 34 that is at the center of, or generally aligned with, the prevailing direction of the wind 16. However, during certain times of the year, the prevailing winds may vary in direction. Accordingly, the disclosed system 10 will allow the modification of the layout of the fans 12 to align the entire system 10 with the prevailing winds during that season, for example.

Figure 5:
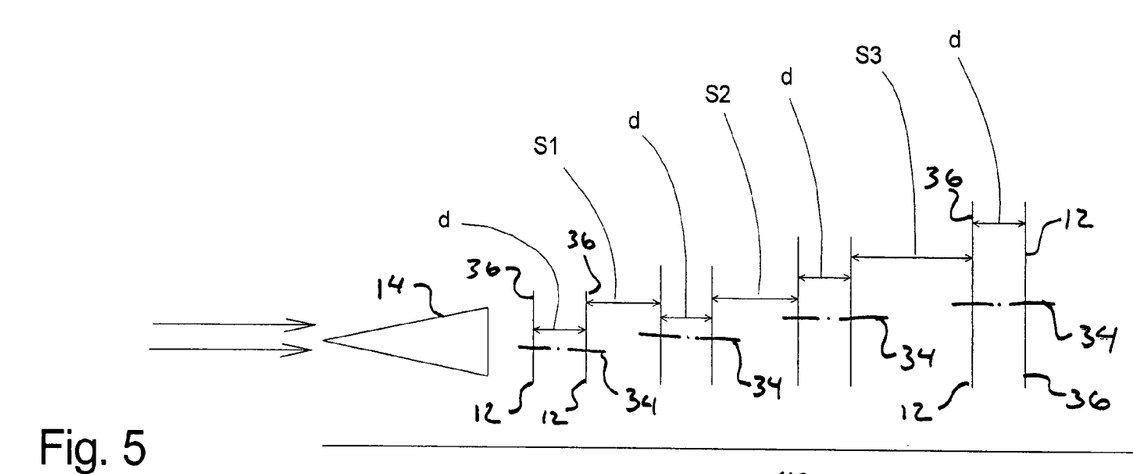
FIG. 5 illustrates the geometric arrangement of the successive fans. The view illustrates the stepped diameter sizes and the spacing between successive fans.

Additionally, as illustrated in FIG. 5, it is contemplated that the spacing between each of the fans 12 will vary depending on the diameter of the preceding fan. In the example shown on FIG. 2, the space "d" is the spacing between a pair of closely positioned fans 36 is fixed, while the distances S1, S2, S3, $S_n$ and so on vary with the dimension or diameter of the preceding pair of closely positioned fans 36. According to a preferred example of the invention, the spacing $S_n$ is calculated as being the diameter of the largest preceding fan plus 15 feet, times 0.7. This formula creates a series of successively larger diameter fans. The rationale behind providing successively larger fans is that each of the succeeding fans will be positioned in the wind shadow of the previous fan. Wind that strikes the previous fan is in part deflected by the previous. Accordingly, in order to capture the deflected wind as well as the wind that undisturbed, each succeeding fan 12 must be larger than the previous fan. It is estimated that the disclosed formula for spacing the fans will optimize the collection of deflected and un-deflected wind, maximizing the collection or harness of power from the prevailing wind.

Figure 6:
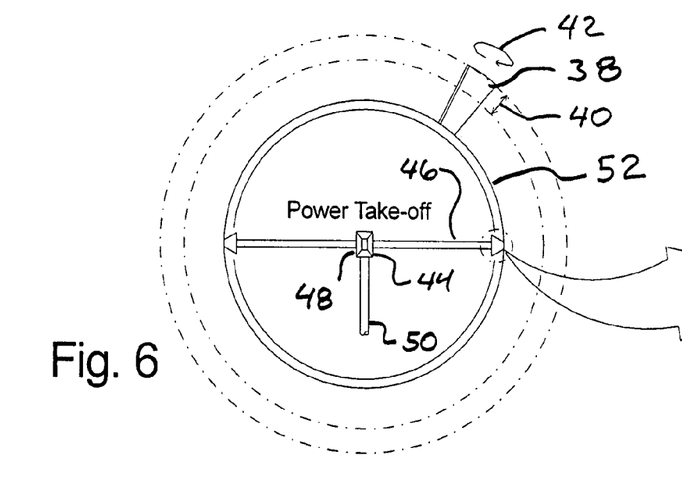
FIG. 6 illustrates the power takeoff and the use of a differential to connect to the fan at a location near the fan blades, and thus reducing the amount of bending and strength of the support structure for the fan blades.

Turning to FIG. 6 it will be understood that it is contemplated that the disclose system will include blades 38 that are mounted on shafts that allow extension and retraction of the blades 38 in a radial direction, as indicated by the arrow 40. Additionally, it is contemplated that the blades 38 will have an adjustable pitch, as indicated by the arrow 42. The extension of the blades 38 will allow the control of the torque generated by the turning fan 12. Thus, in light winds the blades may be extended to increase the torque output, and retracted in heavy winds. Still further, the pitch on each of the blades 38 will be adjusted to further reduce or increase the torque output required of the system.

Figure 6A:
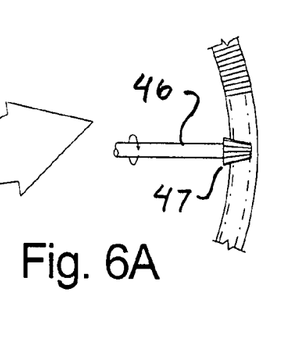

As illustrated in FIGS. 6 and 6A, the torque generated by the turning blades is transmitted to a differential 44. The differential includes shafts 46 that include a pinion gear 47 at one end. The torque generated is transmitted through the shaft and onto a set of gears 48 that transmit the torque to a power takeoff shaft 50 that serves as a power-takeoff mechanism. The power takeoff shaft is in turn connected to a generator that converts the mechanical energy into electrical energy. It is further contemplated that the support ring 52 may include a traction surface that is contacted by tires mounted to the power take-off mechanism. Accordingly, the power take-off mechanism may include a differential gearing, such as is found on an automobile, together with wheels that ride on the traction surface.

As shown on FIGS. 6 and 6A, the fan blades 38 are attached to a support ring 52 that is in turn mounted to rotate about the axis of rotation 34. As discussed above, each of the blades 38 is radially extendable from the axis of rotation.

Turning once again to FIG. 2, it will be understood that in operation the oncoming wind 16 will first encounter the cone 14 and be deflected towards the blades 38. Once the wind 16 has encountered the blades 38 of the first fan, it will then proceed to the next fan. The flow of wind 16 will then progress in a generally conical fashion towards the next fan. As the flow of wind 16 progresses towards the succeeding fan, the wind will combine with undisturbed wind and the deflected wind from the preceding fan. The combined flow of wind is thus focused on the blades of the succeeding fan, causing a greater amount of mass to strike the blades and thus producing a more efficient recovery of the kinetic energy from the moving air.

Thus, it can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A system for harnessing wind power, the system comprising:
    an evaporation cone, the evaporative cone having a generally conical outer surface;
    at least one fluid delivery nozzle, the fluid delivery nozzle being mounted next to the generally conical outer surface so that a fluid delivered from the nozzle will evaporate next to the generally conical outer surface; and
    a plurality of fans, each fan being of a different diameter, positioned next to the evaporative cone, so that evaporating fluid delivered by the fluid delivery nozzle will cause a reduction in pressure next to the fan to accelerate air flow towards the fan.

2. A system according to claim 1 wherein each of said at least one fan includes a portable base.

3. A system according to claim 2 wherein said plurality of fans are positioned along a line that is aligned with a direction of wind travel, and each succeeding fan is of a progressively larger diameter in the direction of wind travel.

4. A system according to claim 2 and further comprising a ballast fluid reservoir mounted from said portable base.

5. A system according to claim 1 wherein each fan has a fan fluid delivery nozzle.

6. A system according to claim 1 wherein each fan has an axis of rotation and a support ring mounted about the axis of rotation, and plurality of blades extending from the support ring.

7. A system according to claim 6 wherein each of said blades is radially extendable from said axis of rotation.

8. A system according to claim 6 and further comprising a power-takeoff mechanism, said power-takeoff mechanism engaging said support ring.

9. A method for harnessing wind power, the method comprising:
    providing an evaporation cone, the evaporative cone having a generally conical outer surface;
    delivering a fluid to the evaporative cone such that the fluid will evaporate next to the generally conical outer surface; and
    positioning a plurality of fans, each fan being of a different diameter, next to the evaporative cone, so that evaporating fluid will cause a reduction in pressure next to the fan to accelerate air flow towards the fan.

10. A method according to claim 9 wherein each of said at least one fan includes a portable base.

11. A method according to claim 10 wherein said step of positioning a plurality of fans comprises positioning the plurality of fans along a line that is aligned with a direction of wind travel, and arranging the plurality of fans such that each succeeding fan is of a progressively larger diameter in the direction of wind travel.

12. A method according to claim 10 and further comprising providing a ballast fluid reservoir mounted from said portable base.

13. A method according to claim 9 and further comprising providing a fan fluid delivery nozzle next to each fan.

14. A method according to claim 9 wherein each fan has an axis of rotation and a support ring mounted about the axis of rotation, and plurality of blades extending from the support ring.

15. A method according to claim 14 wherein each of said blades is radially extendable from said axis of rotation.

16. A method according to claim 14 and further comprising a power-takeoff mechanism, said power-takeoff mechanism engaging said support ring.

* * * * *